United States Patent
Wang et al.

(10) Patent No.: US 11,522,689 B2
(45) Date of Patent: Dec. 6, 2022

(54) QUANTUM KEY DISTRIBUTION DEVICE CAPABLE OF BEING CONFIGURED WITH MULTIPLE PROTOCOLS

(71) Applicant: NANJING UNIVERSITY OF POSTS AND TELECOMMUNICATIONS, Jiangsu (CN)

(72) Inventors: Qin Wang, Jiangsu (CN); Qingqing Jiang, Jiangsu (CN); Huajian Ding, Jiangsu (CN); Chunhui Zhang, Jiangsu (CN); Jian Li, Jiangsu (CN)

(73) Assignee: NANJING UNIVERSITY OF POSTS AND TELECOMMUNICATIONS, Jiangsu (CN)

( * ) Notice: Subject to any disclaimer, the term of this patent is extended or adjusted under 35 U.S.C. 154(b) by 0 days.

(21) Appl. No.: 17/585,494

(22) Filed: Jan. 26, 2022

(65) Prior Publication Data

US 2022/0247557 A1 Aug. 4, 2022

(30) Foreign Application Priority Data

Feb. 1, 2021 (CN) .......................... 202110133329.5

(51) Int. Cl.
*H04L 9/08* (2006.01)
*H04B 10/70* (2013.01)
*G06N 10/60* (2022.01)

(52) U.S. Cl.
CPC .......... *H04L 9/0858* (2013.01); *G06N 10/60* (2022.01); *H04B 10/70* (2013.01)

(58) Field of Classification Search
CPC ....... H04L 9/0858; H04B 10/70; G06N 10/60
(Continued)

(56) References Cited

U.S. PATENT DOCUMENTS

| 2018/0367301 A1* | 12/2018 | Su | H04L 9/0894 |
| 2019/0260478 A1* | 8/2019 | Lucamarini | H04B 10/548 |
| 2021/0306077 A1* | 9/2021 | Lim | H04B 10/70 |

FOREIGN PATENT DOCUMENTS

| CN | 107979463 B | * 6/2020 | ........... H04L 9/0858 |
| CN | 111970110 A | * 11/2020 | |

OTHER PUBLICATIONS

Park et al; 2XN twin field quantum key distribution network configuration based on polarization, wavelength, and time division multiplexing ; 2022; Nature.com; pp. 1-12. (Year: 2022).*

(Continued)

*Primary Examiner* — Amritbir K Sandhu
(74) *Attorney, Agent, or Firm* — JCIPRNET (57) ABSTRACT

The present invention relates to the field of quantum communication, especially a quantum key distribution device that can be configured with multiple protocols. It uses the simplified Faraday-Michelson interference ring in combination with the intensity modulator to perform timestamp encoding in a chopping manner. The phase modulation is completed with a Sagnac ring device composed of a single-polarization phase modulator, a polarization beam splitter and a Faraday rotator, so as to achieve the purpose of composite encoding and decoding, thus realizing a quantum key distribution device which can be configured with multiple protocols and multiple decoy state schemes. This device can be compatible with multiple protocols including BB84 protocol, the reference frame-independent protocol, the six-state protocol and SARG protocol and is characterized with polarization-independent phase modulation and low system complexity.

6 Claims, 4 Drawing Sheets

(58) Field of Classification Search
USPC .......................................................... 380/283
See application file for complete search history.

(56) References Cited

OTHER PUBLICATIONS

Park et al; 2xN twin field quantum field key distribution configuration based on polarization, wavelength and time division multiplexing; 2022; Nature.com; pp. 1-12. (Year: 2022).*

* cited by examiner

QUANTUM KEY DISTRIBUTION DEVICE CAPABLE OF BEING CONFIGURED WITH MULTIPLE PROTOCOLS

CROSS-REFERENCE TO RELATED APPLICATION

This application claims the priority benefit of China application no. 202110133329.5, filed on Feb. 1, 2021. The entirety of the above-mentioned patent application is hereby incorporated by reference and made a part of this specification.

TECHNICAL FIELD

The present invention relates to the field of quantum communication, especially a quantum key distribution device that can be configured with multiple protocols.

BACKGROUND TECHNOLOGY

The proposal of BB84 protocol in 1984 marked the official establishment of quantum cryptography. In a period of time after this, various quantum key distribution (QKD) protocols have emerged constantly. In 1991, A. Ekert et al. proposed E91 protocol based on quantum entanglement properties. Since the preparation technology of entangled photon pairs is not yet mature, its practical application is not strong. Then in 1992, Bennet proposed B92 protocol using two sets of non-orthogonal base encoding. In 1998, someone proposed the six-state protocol using tri-orthogonal state encoding. Since then, SARG protocol, the continuous variable protocol, the reference frame-independent RFI protocol, the differential phase protocol, the counter-intuitive protocol, Ping-Pong protocol and other protocols have been proposed one by one. It can be said that QKD protocols are the cornerstone of the practical application of the QKD technology. Every actual QKD system is built according to a certain protocol.

The performance of QKD protocols is closely related to the actual condition. Therefore, when the actual condition changes, the pros and cons of each protocol may also change. In practical applications, we need to select the optimal protocol according to the actual condition to maximize the performance of the QKD system. If you want to use a common single-protocol QKD system to implement the function of switching protocols, you need to use the main control module to control multiple parallel QKD systems that implement different protocols. Such a scheme can cause a waste of devices and result in a low efficiency.

BRIEF SUMMARY OF THE INVENTION

The solution proposed by the present invention to solve the technical problem is to propose a quantum key distribution (QKD) device that can be configured with multiple protocols and can select the optimal protocol for use according to needs. The QKD device proposed by the present invention can be compatible with multiple protocols, including the BB84 protocol, the reference frame-independent RFI protocol, the six-state protocol and SARG protocol, etc. At the same time, for each protocol, it can implement multiple decoy state schemes, including one-intensity, two-intensity and multiple-intensity decoy state schemes.

A quantum key distribution device that can be configured with multiple protocols, proposed by the present invention, includes a sender, a receiver, and a communication channel used to connect the sender and the receiver.

A quantum key distribution device that can be configured with multiple protocols includes a sender, a receiver, and a communication channel used to connect the sender and the receiver. The above-mentioned sender includes the sender-side main control board, laser, intensity modulator IM1, the sender F-M interference ring, a synchronous laser, intensity modulator IM2, circulator CIR1, an optical attenuator, a wavelength division multiplexing module and a phase encoding module.

The sender-side main control board outputs electrical signals to the laser. The output end of the laser is connected to the input end of IM1, which is used to modulate the quantum light outputted by the laser.

The output end of IM1 is connected to the sender F-M interference ring. The above-mentioned sender F-M interference ring is an unequal-arm F-M interference ring. After passing through the sender F-M interference ring, the quantum light is divided into front and rear bin pulses separated by a certain time, that is, the front bin pulse and the rear bin pulse.

The output end of the sender F-M interference ring is connected to intensity modulator IM2, and the sender F-M interference ring combines with IM2 to complete the Time-bin encoding of the timestamp and to realize the base selection in the protocol. The Time-bin encoding method of the timestamp includes that IM2 chops one of the front and rear bin pulses and allows the front and rear bin pulses to pass through at the same time.

The output end of IM2 is connected to the input end of CIR1. One output end of CIR1 is connected to the phase encoding module, which is used for the phase encoding of the quantum light. The other output end of CIR1 is connected to the optical attenuator, which is used to attenuate the intensity of the quantum light to the single-photon level.

The sender-side main control board outputs electrical signals to the synchronous laser. The output end of the synchronous laser and the output end of the optical attenuator are both connected to the input end of the wavelength division multiplexer. The synchronous light outputted by the synchronous laser and the quantum light outputted by the optical attenuator enter the same optical path through the coupling of the wavelength division multiplexer and then enter the communication channel and are transmitted to the receiver.

The above-mentioned receiver includes the receiver-side main control board, a wavelength division demultiplexing module, the third photoelectric tube and a decoding module.

The above-mentioned wavelength division demultiplexing module is used to demultiplex the light received by the receiver through the communication channel, separate the quantum light and the synchronous light, convert the synchronous light into an electrical signal through the third photoelectric tube and generate a synchronous clock signal and input it to the receiver-side main control board. The quantum light then enters the decoding module.

The above-mentioned decoding module includes the circulator CIR2, the receiver Sagnac ring, CIR3, the receiver F-M interference ring, the first photon detector D1 and the second photon detector D2.

The input end of CIR2 receives the inputted quantum light. One output end of CIR2 is connected to the receiver Sagnac ring, which is used for phase decoding. The other output end of CIR2 is connected to the input end of CIR3. One output end of CIR3 is connected to the receiver F-M interference ring, which is used for Time-bin decoding; and the other output end of CIR3 is connected to the second photon detector D2; the output end of the receiver F-M interference ring is connected to the first photon detector D1.

The receiver-side main control board collects the signals of the first photon detector D1 and the second photon detector D2. At the same time, it processes the signals in combination with the synchronous clock signal to obtain the secure key.

Preferably, the above-mentioned sender F-M interference ring includes beam splitter BS1, Faraday rotator FM1 and Faraday rotator FM2. The beam splitter BS1 has four beam splitting arms, namely beam splitting arm B1, beam splitting arm B2, beam splitting arm B3 and beam splitting arm B4. Splitting arm B3 and splitting arm B4 have different arm lengths, and the port of splitting arm B1 is connected to the output end of intensity modulator IM1, and the port of splitting arm B2 is connected to intensity modulator IM2, and splitting arm B3 and beam splitting arm B4 are respectively connected to Faraday rotator FM1 and Faraday rotator FM2.

The above-mentioned sender F-M interference ring has the same structure as the receiver F-M interference ring.

The receiver F-M interference ring includes beam splitter BS2, Faraday rotator FM4 and Faraday rotator FM5. Beam splitter BS2 has four beam splitting arms, namely beam splitting arm B5, beam splitting arm B6, beam splitting arm B7 and beam splitting arm B8. Beam splitting arm B7 and beam splitting arm B8 have different arm lengths. The port of beam splitting arm B5 is connected to the output end of circulator CIR3, the port of beam splitting arm B6 is connected to the second photon detector, and beam splitting arm B7 and beam splitting arm B8 are respectively connected to Faraday rotator FM4 and Faraday rotator FM5.

Preferably, the above-mentioned Time-bin encoding method of the timestamp includes that IM2 chops one of the front and rear bin pulses and allows the front and rear bin pulses to pass through at the same time.

Preferably, the above-mentioned phase encoding module refers to the sender Sagnac ring. The sender Sagnac ring includes single-polarization phase modulator PM1, Faraday rotator FM3 and polarization beam splitter PBS1. The front bin pulse is divided into H component and V component after passing through polarization beam splitter PBS1. The above-mentioned H component refers to the transmitted light, and the V component refers to the reflected light. After the transmitted H component is phase-modulated by PM1, it is then rotated to the polarization direction of V by FM3 and returns to the original optical path. After the V component is rotated to the polarization direction of H by FM3, it is then phase-modulated through PM1 and returns to the original optical path. The rear bin pulse and the front bin pulse pass through the same optical path. The sender-side main control board transmits the electrical signal to PM1 to modulate the quantum light to the specified phase.

The sender achieves the purpose of composite encoding by combining Sagnac ring phase modulation and Time-bin encoding methods.

The receiver Sagnac ring includes single-polarization phase modulator PM2, Faraday rotator FM6 and polarization beam splitter PBS2. The front bin pulse is divided into H component and V component after passing through polarization beam splitter PBS2. The above-mentioned H component refers to the transmitted light, and the V component refers to the reflected light. The transmitted H component is phase-modulated by PM2, and then rotated to the polarization direction of V by FM6 and then returns back to the original optical path; and the V component is rotated to the polarization direction of H by FM6 and then is phase-modulated through PM2 and returns back to the original optical path. The rear bin pulse and the front bin pulse pass through the same optical path. The receiver-side main control board sends electrical signals to PM2 to modulate the quantum light to the specified phase.

Preferably, the sender further includes the first photoelectric tube; the output end of the above-mentioned intensity modulator IM1 is connected to the first photoelectric tube, and the sender-side main control board collects the signal of the first photoelectric tube while outputting the electrical signal to IM1 to achieve the monitoring and tracking adjustment of the light intensity modulated by IM1 to stabilize it at the same working point and to maintain the stability of the signal-to-induction ratio.

Preferably, the sender further includes the second photoelectric tube; the output end of the above-mentioned intensity modulator IM2 is connected to the second photoelectric tube, and the sender-side main control board collects the signal of the second photoelectric tube while outputting the electrical signal to IM2 to achieve the monitoring and tracking adjustment of the light intensity modulated by IM2 to stabilize its working point.

The configurable multiple protocols in the present invention are divided into the four-state protocol and the six-state protocol in terms of the number of encoding states. In the sender, the four-state protocol uses phase encoding as the encoding mode, and the six-state protocol uses an encoding mode that combines phase encoding and Time-bin encoding. In the receiver, the decoding of the phase encoding is done with the receiver Sagnac ring, and the decoding of the Time-bin encoding is done by comparing the synchronous clock signal with the photon detector signal.

Among them, the four-state protocol uses phase encoding. This means that when the sender Alice chooses to prepare the pulse on the X base, the sender-side intensity modulator IM2 makes all the front and rear bin pulses pass, and the phase of the single-polarization phase modulator PM1 is randomly selected as 0 or $\pi$; when the sender Alice chooses to prepare the pulse on the Z base, the sender-side intensity modulator IM2 makes all the front and rear bin pulses pass, and the phase of PM1 is randomly selected as $\pi/2$ or $3\pi/2$.

The six-state protocol uses an encoding mode that combines phase encoding and Time-bin encoding. This means that when the sender Alice chooses to prepare the pulse on the X base, the sender-side intensity modulator IM2 makes all the front and rear bin pulses pass, and the phase of PM1 is randomly selected as 0 or $\pi$; when the sender Alice chooses to prepare the pulse on the Y base, the sender-side intensity modulator IM2 makes all the front and rear bin pulses pass, and the phase of PM1 is randomly selected as $\pi/2$ or $3\pi/2$; when Alice chooses to prepare the pulse on the Z base, the sender-side intensity modulator IM2 randomly chops one of the front and rear bin pulses, and the phase of PM1 is kept as 0.

Beneficial effects: Compared with the multi-protocol QKD system solution implemented by the conventional parallel single-protocol QKD system, this device can be compatible with multiple protocols, including BB84 protocol, RFI protocol, the six-state protocol and SARG protocol, and can achieve multiple types of decoy state schemes, thus saving a lot of components. In addition, compared to the phase modulator composed of a single phase modulator (PM), the Sagnac ring phase modulator used in the present invention is composed of a single-polarization phase modulator, a polarization beam splitter (PBS) and Faraday rotator FM and can avoid the impact brought by the polarization selectivity of the phase modulator.

Usually, the F-M interference ring is used to realize the phase encoding in the QKD system, but the phase modulation scheme based on the traditional F-M interference ring makes front and rear bin pulses have different attenuations. Therefore, an intensity modulator (IM) needs to be added to balance the intensities of the front and rear bin pulses. This can increase the insertion loss and complexity of the system. On the other hand, an ordinary phase modulator (PM) has the characteristics of polarization selection when working, thus putting forward higher requirements on the optical fiber used to connect various components in the QKD system. Compared with the traditional phase codec scheme based on the F-M interference ring, the codec scheme proposed in the present invention based on the improved F-M interference ring reduces the insertion loss of the receiver. At the same time, the phase encoding module based on the Sagnac ring can ensure that front and rear bin pulses undergo the same attenuation, thus omitting the intensity modulator used to balance the front and rear bin intensity and reducing the system's complexity. In addition, the phase modulation scheme proposed by the present invention avoids the influence brought by the polarization selectivity of the single-polarization phase modulator.

DESCRIPTION OF THE EMBODIMENTS

A quantum key distribution device that can be configured with multiple protocols, proposed by the present invention, includes a sender, a receiver, and a communication channel used to connect the sender and the receiver; the communication channel used to connect the sender and the receiver in the present invention is optical fiber.

Figure 1:
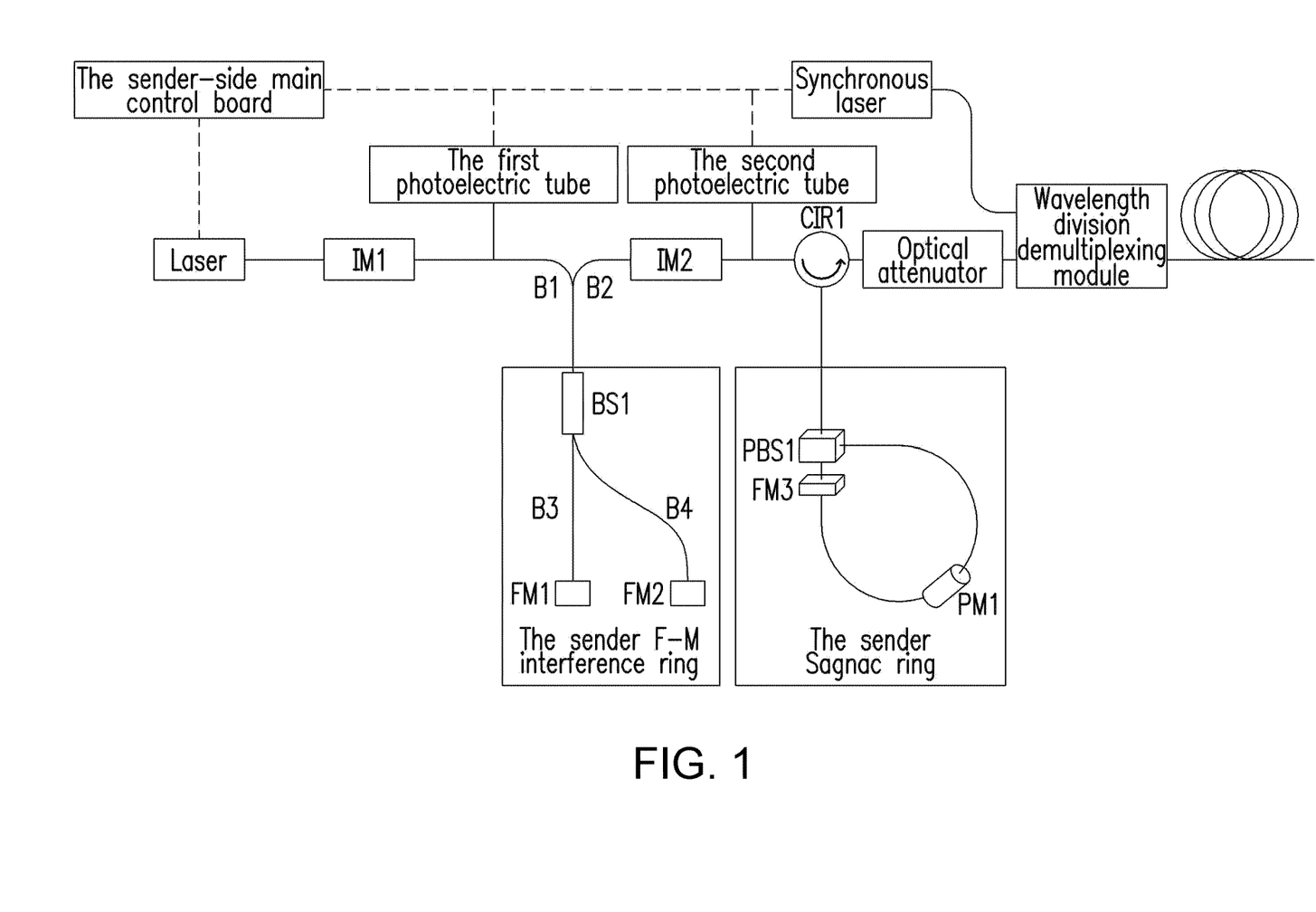
FIG. 1 is a schematic diagram of the sender in the device proposed by the present invention.

As shown in FIG. 1, the above-mentioned sender includes the sender-side main control board, laser, intensity modulator IM1, the sender F-M interference ring, the first photoelectric tube, the second photoelectric tube, a synchronous laser, intensity modulator IM2, an optical attenuator, the sender Sagnac ring and a wavelength division multiplexing module; the dotted lines in the diagram represent the circuit connections, and the solid lines represent optical path connections.

The sender-side main control board outputs electrical signals to the laser. The output end of the laser is connected to the input end of IM1, which is used to modulate the quantum light outputted by the laser. The output end of IM1 is connected to the first photoelectric tube. The sender-side main control board collects the signal of the first photoelectric tube while outputting the electrical signal to IM1 to achieve the monitoring and tracking adjustment of the light intensity modulated by IM1 to stabilize it at the same working point and to maintain the stability of the signal-to-induction ratio. The output end of IM1 is connected to the sender F-M interference ring. After passing through the sender F-M interference ring, the quantum light is divided into the front bin pulse and the rear bin pulse separated by a certain time. The above-mentioned sender F-M interference ring is a unequal-arm F-M interference ring, including 50:50 beam splitter BS1, Faraday rotator FM1 and Faraday rotator FM2. BS1 has four beam splitting arms, namely beam splitting arm B1, beam splitting arm B2, beam splitting arm B3 and beam splitting arm B4. Splitting arm B3 and splitting arm B4 have different arm lengths. B3 is a short arm and B4 is a long arm. The port of splitting arm B1 is connected to intensity modulator IM1, and the port of splitting arm B2 is connected to intensity modulator IM2, which is used to realize the base selection in the protocol. Splitting arm B3 and beam splitting arm B4 are respectively connected to Faraday rotator FM1 and Faraday rotator FM2. One part of quantum light of IM2 enters the second photoelectric tube, and the sender-side main control board collects the signal of the second photoelectric tube while outputting the electrical signal to IM2 to achieve the monitoring and tracking adjustment of the light intensity modulated by IM2 to stabilize its working point. Another part of the quantum light outputted by IM2 enters circulator CIR1. One output end of CIR1 is connected to the sender Sagnac ring to perform phase encoding on the quantum light.

The above-mentioned sender Sagnac ring includes single-polarization phase modulator PM1, Faraday rotator FM3 and polarization beam splitter PBS1. The front bin pulse is divided into H component and V component after passing through polarization beam splitter PBS1. The above-mentioned H component refers to the transmitted light, and the V component refers to the reflected light. After the transmitted H component is phase-modulated by PM1, it is then rotated to the polarization direction of V by FM3 and returns to the original optical path. After the V component is rotated to the polarization direction of H by FM3, it is then phase-modulated through PM1 and returns to the original optical path. The rear bin pulse and the front bin pulse pass through the same optical path.

The other output end of CIR1 is connected to the optical attenuator, which is used to attenuate the intensity of the quantum light to the single-photon level. The output end of the synchronous laser and the output end of the optical attenuator are both connected to the input end of the wavelength division multiplexer. The synchronous light outputted by the synchronous laser and the quantum light outputted by the optical attenuator enter the same optical path through the coupling of the wavelength division multiplexer and then enter the communication channel and are transmitted to the receiver.

The quantum key distribution device of the present invention removes the phase modulator (PM) in the traditional F-M interference ring and uses the simplified F-M interference ring combined with the intensity modulator (IM) to complete the Time-bin encoding in the sender. For example, the following methods can be used to achieve multiple Time-bin encoding: The quantum light is divided into front and rear bin pulses through the F-M interference ring, and the sender uses intensity modulation IM1 to chop one of the front and rear bin pulses, or allows the front and rear bin pulses to pass through at the same time.

Figure 2:
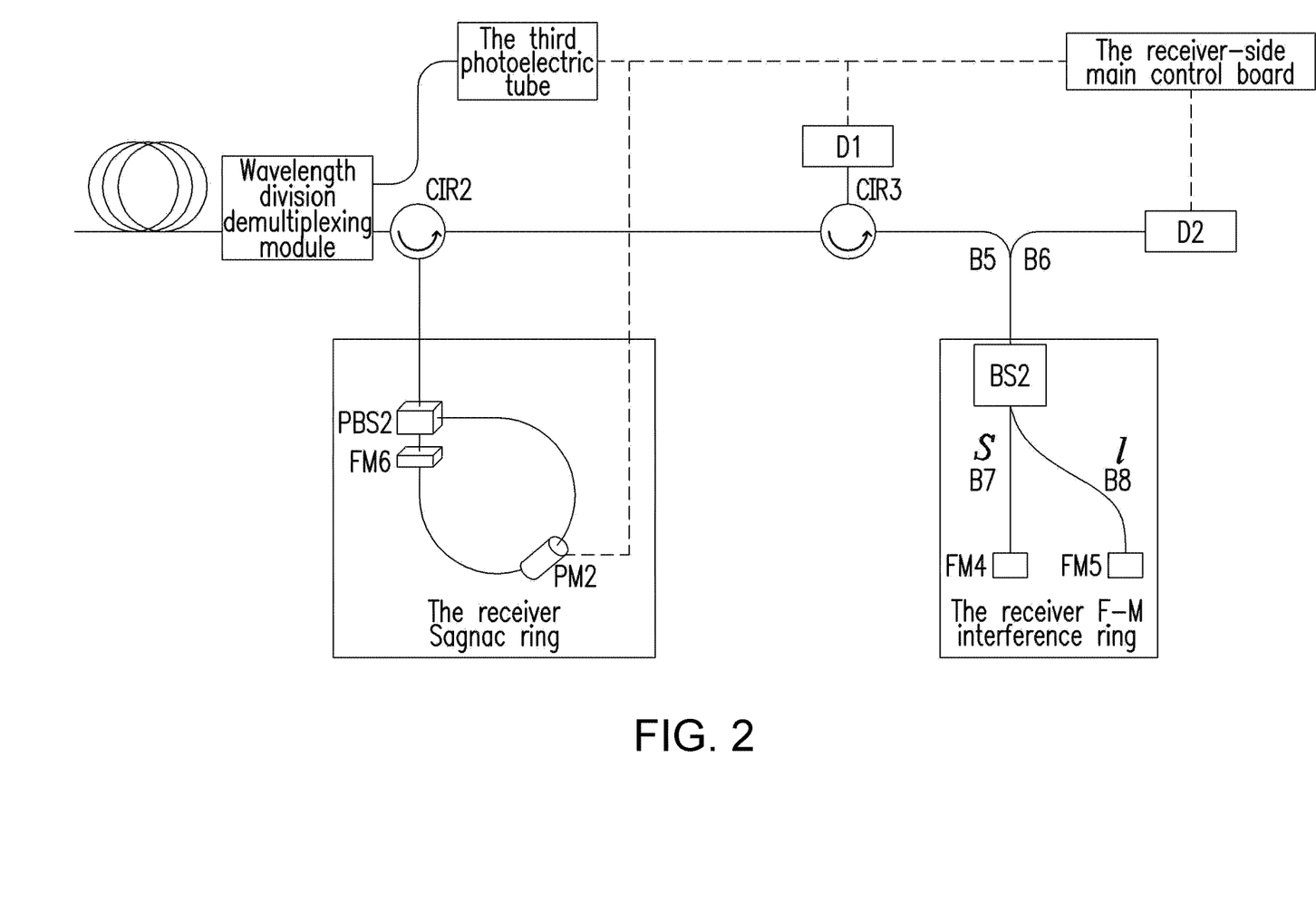
FIG. 2 is a schematic diagram of the receiver in the device proposed by the present invention.

The above-mentioned receiver includes the receiver-side main control board, a wavelength division demultiplexing module, the third photoelectric tube and a decoding module.

The above-mentioned wavelength division demultiplexing module is used to demultiplex the light received by the receiver through the communication channel, separate the quantum light and the synchronous light, convert the synchronous light into an electrical signal through the third photoelectric tube and generate a synchronous clock signal. The quantum light then enters the decoding module to realize the key distribution.

The above-mentioned decoding module includes circulator CIR2, the receiver Sagnac ring, circulator CIR3, the receiver F-M interference ring, the first photon detector D1 and the second photon detector D2.

The input end of CIR2 receives the inputted quantum light. One output end of CIR2 is connected to the receiver Sagnac ring. The other output end of CIR3 is connected to the second photon detector D2.

The above-mentioned receiver Sagnac ring includes single-polarization phase modulator PM2, Faraday rotator FM6 and polarization beam splitter PBS2. The front bin pulse is divided into H component and V component after passing through polarization beam splitter PBS2. The above-mentioned H component refers to the transmitted light, and the V component refers to the reflected light. The transmitted H component is phase-modulated by PM2, and then rotated to the polarization direction of V by FM6 and then returns back to the original optical path; and the V component is rotated to the polarization direction of H by FM6 and then is phase-modulated through PM2 and returns back to the original optical path. The rear bin pulse and the front bin pulse pass through the same optical path. The receiver-side main control board sends electrical signals to PM2 to modulate the quantum light to the specified phase.

The receiver F-M interference ring includes 50:50 beam splitter BS2, Faraday rotator FM4 and Faraday rotator FM5. 50:50 beam splitter BS2 has four beam splitting arms, namely beam splitting arm B5, beam splitting arm B6, beam splitting arm B7 and beam splitting arm B8. B7 and B8 have different arm lengths. B7 is a short arm and B8 is a long arm. The port of beam splitting arm B5 is connected to the output end of circulator CIR3, the port of beam splitting arm B6 is connected to the second photon detector, and beam splitting arm B7 and beam splitting arm B8 are respectively connected to Faraday rotator FM4 and Faraday rotator FM5.

The receiver-side main control board collects signals from the first photon detector, the second photon detector and the third photoelectric tube, and obtains the synchronous clock signal from the signal of the third photoelectric tube while processing the signals received by the first photon detector and the second photon detector to obtain the key. In addition, the receiver-side main control board sends electrical signals to the single-polarization phase modulator PM2 to modulate the quantum light to the specified phase.

The present invention will be further described in detail below in conjunction with the accompanying drawings of the Description.

This device can be compatible with multiple protocols, including BB84 protocol, RFI protocol, the six-state protocol and SARG protocol, and can implement different decoy state schemes. The following takes BB84 protocol and RFI protocol as examples to describe the device in detail.

The present invention takes the two-intensity decoy state scheme as an example. For other schemes, you only need to change the number of possible values of the input electrical signal amplitude of intensity modulator IM1. The N-intensity decoy state scheme means that the quantum light outputted by the laser has N+1 types of intensity after it is modulated by IM1. One of them is used as signal state intensity, and N are used as decoy state intensities.

According to the BB84 protocol, the signal sender Alice and the signal receiver Bob implement key distribution according to the following process. Before performing the following steps, both parties need to agree on the definition rules of 1 and 0 bits:

Step 1. Emission: The sender Alice randomly modulates each weakly coherent state pulse into light intensity x with a probability of $P_x$, where $x \in \{\mu, v_1, v_2\}$, $\mu$ is the signal state intensity, and $v_1, v_2$ are the intensities of the two decoy states, respectively. Moreover, Alice randomly prepares each pulse on the Z base with a probability of $P_{Z|x}$, and randomly prepares each pulse on the X base with a probability of $P_{X|x}$, where $P_{Z|x} + P_{X|x} = 1$, and then sends the modulated pulses to the receiver Bob according to the time sequence; where $P_{Z|x}$ refers to the probability of each pulse with a light intensity of x being prepared on the Z base, and $P_{X|x}$ refers to the probability of each pulse with a light intensity of x being prepared on the X base. When Alice chooses to prepare the pulse on the X base, the sender-side intensity modulator IM2 makes both the front and rear bin pulses pass, and the phase of the single-polarization phase modulator PM1 is randomly selected as 0 or $\pi$; when Alice chooses to prepare the pulse on the Z base, the sender-side intensity modulator IM2 makes both the front and rear bin pulses pass, and the phase of the single-polarization phase modulator PM1 is randomly selected as $\pi/2$ or $3\pi/2$.

Step 2. Base selection and measurement: The receiver Bob randomly selects a base from the X base and the Z base with a probability of $P_X$ and $P_Z(P_Z=1-P_X)$ respectively to perform projection measurement operation on each pulse it receives. If Bob measures a pulse, it will record the corresponding measurement result and announce the position of the pulse. So far, the sender Alice and the receiver Bob get the initial bit string 'raw key'. When Bob selects the X base for measurement, the phase of the single-polarization phase modulator PM2 is randomly selected as 0 or $\pi$; when Bob selects the Z base for measurement, the phase of the single-polarization phase modulator PM2 is randomly selected as $\pi/2$ or $3\pi/2$.

Step 3. Base pairing: The sender Alice and the receiver Bob respectively announce their preparation and measurement bases for each pulse through the open communication channel. If the preparation base of Alice matches the measurement base of Bob, the base pairing is recorded as successful and the sifted bit string 'sift key' is obtained; otherwise, the base pairing is recorded as failure and both parties shall discard the measured data.

Step 4. Generate a key: The sender Alice and the receiver Bob will perform post-processing operations such as error correction and confidentiality amplification on the sifted bit string 'sift key' after the pairing is successful, so as to obtain the secure key.

When the device executes the BB84 protocol, the intensity modulator IM1 is used to realize the modulation of the signal state and the decoy state. The three amplitudes of the input electrical signal of IM1 correspond to signal state, decoy state and vacuum state, respectively. When the vacuum state is selected, IM1 uses the maximum attenuation while turning off the laser at the same time. Intensity modulator IM2 always allows both the front and rear pulses to pass. The four amplitudes of the input electrical signal of the sender Alice's single-polarization phase modulator PM1 correspond to the four phases, namely 0, $\pi/2$, $\pi$ and $3\pi/2$, of the sender-side single-polarization phase modulator PM1, respectively; the four amplitudes of the input electrical signal of the receiver Bob's single-polarization phase modulator PM2 correspond to the four phases, namely 0, π/2, π and 3π/2, of the receiver-side single-polarization phase modulator PM2, respectively. If the phases selected by the sender Alice and the receiver Bob are marked as $\theta_A$ and $\theta_B$, respectively, the following process can be used to calculate the response probability of the detector.

First, the quantum light passes through the sender F-M ring and is divided into front and rear bin pulses. After the pulses pass through the sender Sagnac ring, $\theta_A$ is added to each pulse passing through the long-arm beam splitting arm B4; after the pulses pass through the receiver Sagnac ring, $\theta_B$ is added to each pulse passing through the short-arm beam splitting arm B7. After passing through the receiver F-M ring, each bin pulse is divided into front and rear bin pulses. The specific formula derivation process is as follows:

$$|o\rangle \xrightarrow{\text{Through the sender F-M ring}} \frac{1}{2}(|s\rangle+|l\rangle) \xrightarrow{\text{Through the sender Sagnac ring}} \frac{1}{2}(|s\rangle+ \quad (1)$$

$$e^{i\theta_A}|l\rangle) \xrightarrow{\text{Through the receiver F-M ring}} \frac{1}{2}\left(e^{i\theta_B}|s\rangle + e^{i\theta_A}|l\rangle\right) \xrightarrow{\text{Through the receiver Sagnac ring}}$$

$$\begin{cases} \text{Port 1}: \quad \frac{1}{4}\left[e^{i\theta_B}(|ss\rangle+|sl\rangle) + e^{i\theta_A}(|ls\rangle+|ll\rangle)\right] \\ \text{Port 2}: \quad \frac{1}{4}\left[e^{i\theta_B}(|ss\rangle-|sl\rangle) + e^{i\theta_A}(|ls\rangle-|ll\rangle)\right] \end{cases}$$

Where: $|o\rangle$ represents the quantum light entering the sender F-M ring; $|s\rangle$ and $|l\rangle$ respectively represent the front bin pulse and the rear bin pulse formed after the quantum light passes through the sender F-M ring, in which $|l\rangle$ represents the pulse passing through long-arm beam splitting arm B4 in the sender Sagnac ring, and $|s\rangle$ represents the pulse passing through short-arm beam splitting arm B4 in the sender Sagnac ring.

Only the pulses that pass through the long-arm beam splitter arm B4 of the sender F-M ring and the short-arm beam splitter arm B7 of the receiver F-M ring at the same time as well as the pulses that pass through the short-arm beam splitter arm B3 of the sender F-M ring and the long-arm beam splitter arm B8 of the receiver F-M ring at the same time can produce interference, and no interference can be generated in other cases, so only the interference terms are retained and Equation (1) can be simplified as:

$$\text{Port 1}: \frac{1}{4}\left(e^{i\theta_A}|ls\rangle + e^{i\theta_B}|sl\rangle\right); \quad (2)$$

$$\text{Port 2}: \frac{1}{4}\left(e^{i\theta_A}|ls\rangle - e^{i\theta_B}|sl\rangle\right);$$

The corresponding response probabilities of the first photon detector and the second photon detector respectively are:

$$P_1 = \frac{1}{16}|e^{i\theta_A} + e^{i\theta_B}|^2 = \frac{1}{8}[1+\cos(\theta_A-\theta_B)], \quad (3)$$

$$P_2 = \frac{1}{16}|e^{i\theta_A} - e^{i\theta_B}|^2 = \frac{1}{8}[1-\cos(\theta_A-\theta_B)]. \quad (4)$$

Therefore, the relationship between the response probabilities of the detectors and the selected phases of the sender Alice's phase modulator PM1 and the receiver Bob's phase modulator PM is shown in Table I:

Table I The corresponding relationship between the phase magnitudes applied by the sender Alice's & the receiver Bob's phase modulators and the response probabilities of the detectors

| $P_1$, $P_2$ | | The receiver Bob | | | |
|---|---|---|---|---|---|
| | | 0 | π | π/2 | 3π/2 |
| The sender Alice | 0 | ¼, 0 | 0, ¼ | ⅛, ⅛ | ⅛, ⅛ |
| | π | 0, ¼ | ¼, 0 | ⅛, ⅛ | ⅛, ⅛ |
| | π/2 | ⅛, ⅛ | ⅛, ⅛ | ¼, 0 | 0, ¼ |
| | 3π/2 | ⅛, ⅛ | ⅛, ⅛ | 0, ¼ | ¼, 0 |

When the detectors respond, the sender Alice and the receiver Bob pair the base through the classic communication channel. If the bases selected by both parties are different, the result of this time will be discarded; if the bases selected by both parties are the same, a secure key will be generated.

The secure key rate (R) of the BB84 protocol can be written as:

$$R = P_\mu P_{Z|\mu} P_Z \{-Q_\mu f(E_\mu) H_2(E_\mu) + Q_1^L[1-H_2(e_1^U)]\}. \quad (5)$$

Where, $f(E_\mu)$ represents the error correction efficiency; $P_\mu$ represents the probability of selecting the signal state, where $P_{Z|\mu}$ refers to the probability that Alice selects the Z base under the condition of selecting the intensity μ; $P_Z$ refers to the probability that Bob selects the Z base; $Q_\mu$ represents the gain; $E_\mu$ represents the qubit error rate; $Q_1^L$ means the lower bound of the single-photon gain.

$H_2(x)$ is the binary entropy function, and its expression is:

$$H_2(x) = -x\log_2 x - (1-x)\log_2(1-x). \quad (6)$$

The light source uses a weakly coherent light source WCS. The expressions of gain $Q_\mu$ and qubit error rate $E_\mu$ are given by the following equations:

$$Q_\chi = Y_0 + 1 - e^{-\eta\chi}, \quad (7)$$

$$E_\chi Q_\chi = e_0 Y_0 + e_{Det}(1-e^{-\eta\chi}). \quad (8)$$

Where, $\chi \in \{\mu, v_1, v_2\}$, and $e_0$ is the error probability of the background light. Since the background light is generally considered to be completely random, there is a probability of 0.5 respectively to produce correct and incorrect detection results, namely $e_0=0.5$. $Y_0$ is the dark count rate of the detector, $e_{Det}$ is the background bit error rate, and η is the transmission efficiency between the sender Alice and the receiver Bob. The relationship between η and the distance L between the sender Alice and the receiver Bob is:

$$\eta = \eta_D 10^{-\alpha L/10}. \quad (9)$$

Where, $\eta_D$ is the detection efficiency of the single-photon detector, and α is the loss coefficient of the optical fiber. $Q_1^L$ is the lower bound of the single-photon gain, and its expression is given by:

$$Q_1^L = \frac{\mu^2 e^{-\mu}}{\mu v_1 - \mu v_2 - v_1^2 + v_2^2}\left[Q_{v_1}e^{v_1} - Q_{v_2}e^{v_2} - \frac{v_1^2 - v_2^2}{\mu^2}(Q_\mu - Y_0^L)\right]. \quad (10)$$

Where, μ is the intensity of the signal state; $v_1, v_2$ are respectively the intensities of the two decoy states; $Q_{v_1}$ represents the gain of the decoy state whose intensity is $v_1$; $Q_{v_2}$ represents the gain of the decoy state whose intensity is $v_2$; $Y_0^L$ represents the lower bound of the zero photon count rate and its expression is given by the following equation:

$$Y_0^L = \max\left\{\frac{v_1 Q_{v_2} e^{v_2} - v_2 Q_{v_1} e^{v_1}}{v_1 - v_2}, 0\right\}. \tag{11}$$

$e_1^U$ represents the upper bound of the single-photon error rate and its expression is given by the following equation:

$$e_1^U = \frac{E_{v_1} Q_{v_1} e^{v_1} - E_{v_2} Q_{v_2} e^{v_2}}{(v_1 - v_2) Y_1^L}. \tag{12}$$

Where, $Y_1^L$ represents the lower bound of the zero photon count rate and its expression is given by the following equation:

$$Y_1^L = \frac{\mu}{\mu v_1 - \mu v_2 - v_1^2 + v_2^2}\left[Q_{v_1} e^{v_1} - Q_{v_2} e^{v_2} - \frac{v_1^2 - v_2^2}{\mu^2}(Q_\mu - Y_0^L)\right]. \tag{13}$$

According to the RFI protocol, the signal sender Alice and the signal receiver Bob implement key distribution according to the following process. Before performing the following steps, both parties need to agree on the definition rules of 1 and 0 bits:

Step 1. Emission: The sender Alice randomly modulates each weakly coherent state pulse into light intensity x with a probability of $P_x$, where $x \in \{\mu, v_1, v_2\}$, $\mu$ is the signal state intensity, and $v_1, v_2$ are the intensities of the two decoy states, respectively. Moreover, Alice randomly prepares each pulse on the Z base with a probability of $P_{Z1x}$, and randomly prepares each pulse on the X base with a probability of $P_{X1x}$, and randomly prepares each pulse on the Y base with a probability of $P_{Y1x}$, where $P_{Z1x} + P_{X1x} + P_{Y1x} = 1$, and then sends the modulated pulses to the receiver Bob according to the time sequence; where $P_{Z1x}$ refers to the probability of each pulse with a light intensity of x being prepared on the Z base, $P_{X1x}$ refers to the probability of each pulse with a light intensity of x being prepared on the X base, and $P_{Y1x}$ refers to the probability of each pulse with a light intensity of x being prepared on the Y base. When Alice chooses to prepare the pulse on the X base, the sender-side intensity modulator IM2 makes both the front and rear bin pulses pass, and the phase of the single-polarization phase modulator PM1 is randomly selected as 0 or $\pi$; when Alice chooses to prepare the pulse on the Y base, the sender-side intensity modulator IM2 makes both the front and rear bin pulses pass, and the phase of the single-polarization phase modulator PM1 is randomly selected as $\pi/2$ or $3\pi/2$; when Alice chooses to prepare the pulse on the Z base, the sender-side intensity modulator IM2 randomly chops one of the front and rear bin pulses, and the phase of the single-polarization phase modulator PM1 is kept at 0.

Step 2. Base selection and measurement: The receiver Bob randomly selects a base from the X base, the Y base and the Z base with a probability of $P_X$, $P_Y$ and $P_Z$ ($P_Z = 1 - P_X - P_Y$) respectively to perform projection measurement operation on each pulse it receives. If Bob measures a pulse, it will record the corresponding measurement result and announce the position of the pulse. So far, the sender Alice and the receiver Bob get the initial bit string 'raw key'. When Bob selects the X base for measurement, the phase of the single-polarization phase modulator PM2 is randomly selected as 0 or $\pi$; when Bob selects the Y base for measurement, the phase of the single-polarization phase modulator PM2 is randomly selected as $\pi/2$ or $3\pi/2$; when Bob selects the Z base for measurement, the phase of the single-polarization phase modulator PM2 is fixed as 0.

Step 3. Base pairing: The sender Alice and the receiver Bob respectively announce their preparation and measurement bases for each pulse through the open communication channel. If the preparation base of Alice matches the measurement base of Bob, the base pairing is recorded as successful and the sifted bit string 'sift key' is obtained; otherwise, the base pairing is recorded as failure.

Step 4. Generate a key: The sender Alice and the receiver Bob will perform post-processing operations such as error correction and confidentiality amplification on the sifted bit string "sift key" after the base pairing is successful, so as to obtain the secure key.

When the device executes the RFI protocol, the intensity modulator IM1 is also used to realize the modulation of the signal state and the decoy state. The three amplitudes of the input electrical signal of IM1 correspond to signal state, decoy state and vacuum state, respectively. When the vacuum state is selected, IM1 uses the maximum attenuation while turning off the laser at the same time. When the vacuum state is selected, the intensity modulator IM1 uses the maximum attenuation and turns off the laser at the same time. If the Z base is selected, the two electrical signals inputted by the sender Alice's intensity modulator IM2 respectively correspond to the chopping front bin pulse and the chopping rear bin pulse, and the amplitude of the electrical signal inputted from the sender-side phase modulator PM1 is always 0; if the X or Y base is selected, intensity modulator IM2 always allows both the front and rear pulses to pass. The amplitude of the input electrical signal of the sender-side phase modulator PM1 decides whether the sender-side phase is 0, $\pi/2$, $\pi$ or $3\pi/2$. The four amplitudes of the input electrical signal of the receiver Bob's phase modulator PM2 correspond to the four phases, namely 0, $\pi/2$, $\pi$ and $3\pi/2$, of the receiver-side phase modulator PM2, respectively. The receiver Sagnac ring is used for the demodulation of BB84 protocol and the demodulation of RFI protocol's X and Y bases. The F-M interference ring of the receiver is used for the interference of BB84 protocol pulses, the interference of RFI protocol's X and Y base pulses and the demodulation of RFI protocol's Z base.

When X and Y bases are selected, phase encoding is used and the calculation method of the response probabilities of the detectors is the same as that of BB84 protocol; when the Z base is selected, Time-bin encoding is used and the calculation method of the response probabilities of the detectors is as follows:

$$|o\rangle \xrightarrow{\text{Through the sender } F-M \text{ ring}} \frac{1}{2}(|s\rangle + |l\rangle) \xrightarrow{\text{Through } IM2} \begin{cases} \text{Front bin} \\ \text{pulse} : \frac{1}{2}|s\rangle \\ \text{Rear bin} \\ \text{pulse} : \frac{1}{2}|l\rangle \end{cases}, \tag{14}$$

$$\text{Front bin pulse} : \frac{1}{2}|s\rangle \xrightarrow{\text{Through the receiver } F-M \text{ ring}} \begin{cases} \text{Port 1: } \frac{1}{4}(|ss\rangle + |sl\rangle) \\ \text{Port 2: } \frac{1}{4}(|ss\rangle - |sl\rangle) \end{cases}; \tag{15}$$

$$\text{Rear bin pulse} : \frac{1}{2}|l\rangle \xrightarrow{\text{Through the receiver } F-M \text{ ring}} \begin{cases} \text{Port 1: } \frac{1}{4}(|ls\rangle + |ll\rangle) \\ \text{Port 2: } \frac{1}{4}(|ls\rangle - |ll\rangle) \end{cases}.$$

The response probabilities of the first photon detector and the second photon detector corresponding to the front bin pulse and rear bin pulse respectively are:

Front bin pulse:

$$P_1 = P_2 = \frac{1}{8}; \quad (16)$$

Rear bin pulse:

$$P_1 = P_2 = \frac{1}{8}. $$

The front bin pulse and the rear bin pulse cannot be distinguished only based on whether the first photon detector and the second photon detector respond. The decoding of Time-bin encoding also needs to use the difference caused by the front bin pulse and the rear bin pulse in the response times of the first photon detector and the second photon detector, that is, the front bin pulse can cause the response of the first photon detector and the second photon detector earlier than the corresponding rear bin pulse.

The secure key rate (R) of RFI protocol can be written as:

$$R = P_\mu P_A^Z P_B^Z [P_1^\mu Y_{ZZ}^{1,L}(1 - I_E) - Q_{ZZ}^\mu f(E_{ZZ}^\mu) h(E_{ZZ}^\mu)]. \quad (17)$$

Where, $P_\mu$, $P_A^Z$ and $P_B^Z$ are respectively the probability of selecting the signal state, the probability of the sender Alice selecting the Z base and the probability of the receiver Bob selecting the Z base. $P_i^\mu$ and $P_i^\nu$ are respectively the probability that the pulse sent is photon pulse i when the signal state and the decoy state are selected, where i is a non-negative integer. When the light source is WCS light source, $$P_i^\mu = \frac{\mu^i e^{-\mu}}{i!}, \quad (18)$$

$$P_i^\nu = \frac{\nu^i e^{-\nu}}{i!}. \quad (19)$$

μ and ν are respectively the intensities of the signal state and the decoy state. $Y_{ZZ}^{1,L}$ is the single-photon count rate of the signal state when the sender Alice and the receiver Bob both select the Z base. $Y_{ZZ}^{1,L}$ can be obtained through the following equation:

$$Y_{\zeta_A \zeta_B}^{1,L} = \frac{\mu}{\mu\nu - \nu^2}\left(e^\nu Q_{\zeta_A \zeta_B}^\nu - e^\mu \frac{\nu^2}{\mu^2} Q_{\zeta_A \zeta_B}^\mu - \frac{\mu^2 - \nu^2}{\mu^2} Q^\omega\right). \quad (20)$$

Where, $Q^\omega$ represents the gain of the vacuum state. $Y_0$ represents the dark count rate of the detector, and $Q^\omega = 2Y_0(1-Y_0)$. $Q_{\zeta_A \zeta_B}^\lambda$ represents the gain of the state which is prepared with the $\zeta_A$ base and measured with the $\zeta_B$ base and whose intensity is $\lambda$. $\lambda \in \{\mu, \nu\}$, $\zeta_A \zeta_B \in \{Z_A Z_B, X_A X_B, X_A Y_B, Y_A X_B, Y_A Y_B\}$. $Q_{\zeta_A \zeta_B}^\lambda$ can be written as $$Q_{\zeta_A \zeta_B}^\lambda = \frac{1}{2}\left(P_{\zeta_A^0 \zeta_B^0}^\lambda + P_{\zeta_A^0 \zeta_B^1}^\lambda + P_{\zeta_A^1 \zeta_B^0}^\lambda + P_{\zeta_A^1 \zeta_B^1}^\lambda\right). \quad (21)$$

$\zeta_A^0$ and $\zeta_A^1$ form base $\zeta_A$, and $\zeta_B^0$ and $\zeta_B^1$ form base $\zeta_B$, and $P_{X_A^0 X_B^0}^\lambda$ satisfies $$P_{X_A^0 X_B^0}^\lambda = e^{-\lambda\eta}(1-Y_0)[e^{\lambda\eta(1+\cos\beta)/2} + Y_0 - 1]. \quad (22)$$

Similarly, $$P_{X_A^0 X_B^1}^\lambda = e^{-\lambda\eta}(1-Y_0)[e^{\lambda\eta(1-\cos\beta)/2} + Y_0 - 1], \quad (23)$$

$$P_{X_A^1 X_B^0}^\lambda = e^{-\lambda\eta}(1-Y_0)[e^{\lambda\eta(1-\cos\beta)/2} + Y_0 - 1], \quad (24)$$

$$P_{X_A^1 X_B^1}^\lambda = e^{-\lambda\eta}(1-Y_0)[e^{\lambda\eta(1+\cos\beta)/2} + Y_0 - 1]. \quad (25)$$

So we can calculate $$Q_{X_A X_B}^\lambda = e^{-\lambda\eta}(1-Y_0)[e^{\lambda\eta(1+\cos\beta)/2} + e^{\lambda\eta(1-\cos\beta)/2} + 2Y_0 - 2]. \quad (26)$$

Where, η represents the efficiency of transmission between the sender Alice and the receiver Bob, and β represents the deflection angle. Following the same process, we can calculate $$Q_{Z_A Z_B}^\lambda = e^{-\lambda\eta}(1-Y_0)[e^{\lambda\eta} + 2Y_0 - 1], \quad (27)$$

$$Q_{X_A Y_B}^\lambda = e^{-\lambda\eta}(1-Y_0)[e^{\lambda\eta(1+\sin\beta)/2} + e^{\lambda\eta(1-\sin\beta)/2} + 2Y_0 - 2], \quad (28)$$

$$Q_{Y_A X_B}^\lambda = e^{-\lambda\eta}(1-Y_0)[e^{\lambda\eta(1+\sin\beta)/2} + e^{\lambda\eta(1-\sin\beta)/2} + 2Y_0 - 2], \quad (29)$$

$$Q_{Y_A Y_B}^\lambda = e^{-\lambda\eta}(1-Y_0)[e^{\lambda\eta(1+\cos\beta)/2} + e^{\lambda\eta(1-\cos\beta)/2} + 2Y_0 - 2]. \quad (30)$$

The background bit error rate is marked with $e_{Det}$, and the qubit error rate of the state with an intensity of λ under the $\zeta_A \zeta_B$ base is $$E_{\zeta_A \zeta_B}^\lambda = \min\{\tilde{E}_{\zeta_A \zeta_B}^\lambda, 1 - \tilde{E}_{\zeta_A \zeta_B}^\lambda\}. \quad (31)$$

Where, $$\tilde{E}_{\zeta_A \zeta_B}^\lambda = e_{Det}(1 - 2e_{\zeta_A \zeta_B}^\lambda) + e_{\zeta_A \zeta_B}^\lambda, \text{ and } e_{\zeta_A \zeta_B}^\lambda = \frac{1}{2}\left(P_{\zeta_A^0 \zeta_B^1}^\lambda + P_{\zeta_A^1 \zeta_B^0}^\lambda\right)/Q_{\zeta_A \zeta_B}^\lambda.$$

Considering the vacuum state's qubit error rate $$E^\omega = \frac{1}{2},$$

we can calculate the upper bound of the single-photon error rate under the $\zeta_A \zeta_B$ base $$e_{\zeta_A \zeta_B}^{1,U} = \min\left\{\frac{e^\nu E_{\zeta_A \zeta_B}^\nu Q_{\zeta_A \zeta_B}^\nu - E^\omega Q^\omega}{\nu Y_{\zeta_A \zeta_B}^{1,L}}, 0.5\right\}. \quad (32)$$

In Equation (17), $I_E$ represents the amount of information of the eavesdropper Eve. Unlike the BB84 protocol, the RFI protocol only forms codes under the Z base, and the data of X and Y bases are used to estimate the amount of information of the eavesdropper. At the same time, the data about the failure of base pairing under X and Y bases also need to be retained. The expression of $I_E$ is given by the following equation:

$$I_E = (1 - e_{ZZ}^{1,U})h\left(\frac{1+U}{2}\right) + e_{ZZ}^{1,U}h\left(\frac{1+V}{2}\right). \quad (33)$$

Where, $$U = \min\{1, \sqrt{C/2}/(1 - e_{ZZ}^{1,U})\}, \quad (34)$$

$$V=\sqrt{C/2-(1-e_{ZZ}^{1,U})^2}/e_{ZZ}^{1,U}. \quad (35)$$

C is a function about the single-photon error rate under X and Y bases. It has strong robustness to a slowly changing deflection angle. The expression of C is as follows:

$$C=(1-2e_{X_AX_B}^{1,U})^2+(1-2e_{X_AY_B}^{1,U})^2+(1-2e_{Y_AX_B}^{1,U})^2+(1-2e_{Y_AY_B}^{1,U})^2. \quad (36)$$

When there are no eavesdroppers and other errors, C gets the maximum value, that is 2.

The above methods of preparing states by implementing BB84 protocol and RFI protocol are also applicable to the six-state protocol and SARG protocol, so the device is also compatible with the six-state protocol and SARG protocol.

In order to make its technical solution, purpose and advantages clearer, the present invention is further described in detail by using numerical simulation with reference to the accompanying drawings.

Figure 3:
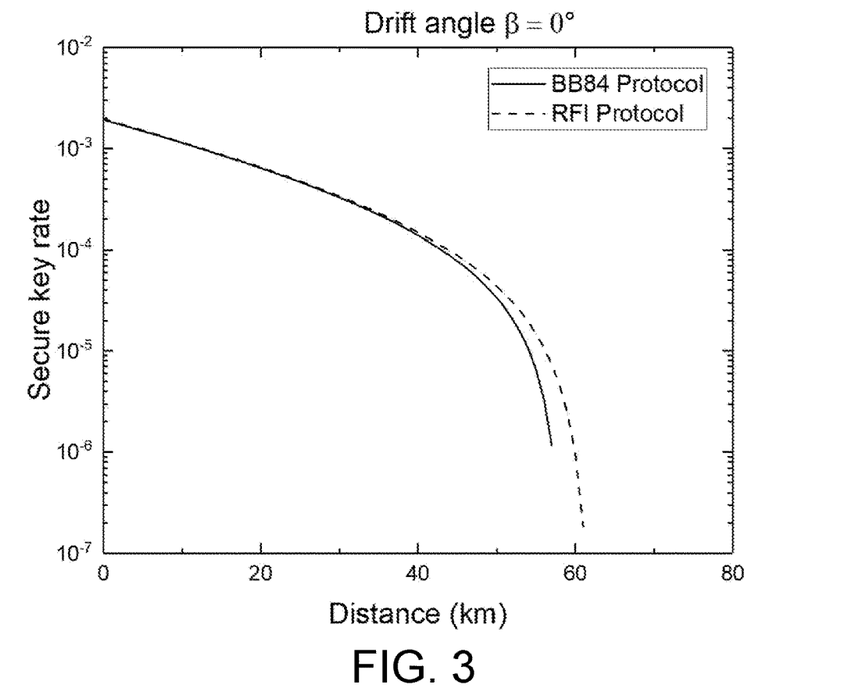
FIG. 3 is a simulation diagram of secure key rates of BB84 and RFI protocols when there is no deflection angle.
Figure 4:
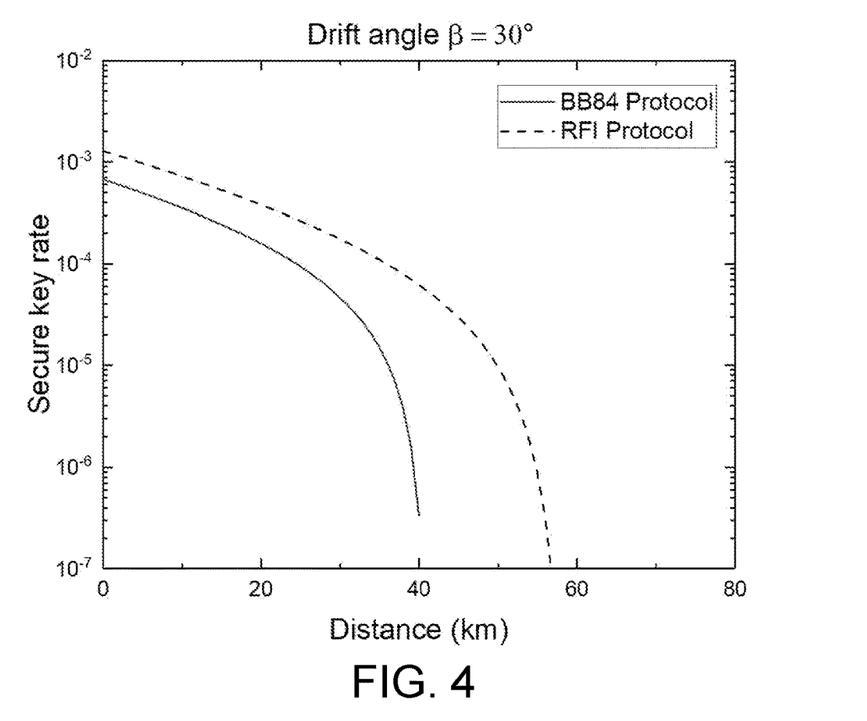
FIG. 4 is a simulation diagram of secure key rates of BB84 and RFI protocols when the deflection angle is 30°.

FIG. 3 and FIG. 4 are respectively the change curves of the secure key rates of BB84 protocol and RFI protocol with respect to the transmission distance when the deflection angles are 0° and 30°. In the diagrams, the horizontal axis is the transmission distance between the sender Alice and the receiver Bob, and the vertical axis is the secure key rate. Solid and dashed lines respectively represent the secure key rate of BB84 protocol and RFI protocol. In the simulation, we used the Gaussian approximation method applied in the paper "Parameter optimization in biased decoy-state quantum key distribution with both source errors and statistical fluctuations" (Quantum Inf. Process., 16, 238 (2017)) by Jian-Rong Zhu et al. to estimate the impact of statistical fluctuations. The number of pulses, N, used in the simulation is $10^{11}$, which is consistent with the number of pulses used in the experiment. The values of other parameters used in the simulation are shown in Table II:

TABLE II

List of other system parameters used in the simulation

| f(x) | $Y_0$ | $e_{Det}^Z$ | $e_{Det}^X$ | $\eta_D$ | α |
|------|-------|-------------|-------------|----------|---|
| 1.16 | $4 \times 10^{-5}$ | 1.59% | 2.5% | 80% | 0.2 dB/km |

Where, f(x) is the error correction efficiency, $Y_0$ is the dark count rate of the detector, $e_{Det}^Z$ and $e_{Det}^X$ are respectively the background bit error rate when the Z base and the X base are selected, $\eta_D$ is the detector's efficiency, and α is the optical fiber's loss coefficient.

Figure 5:
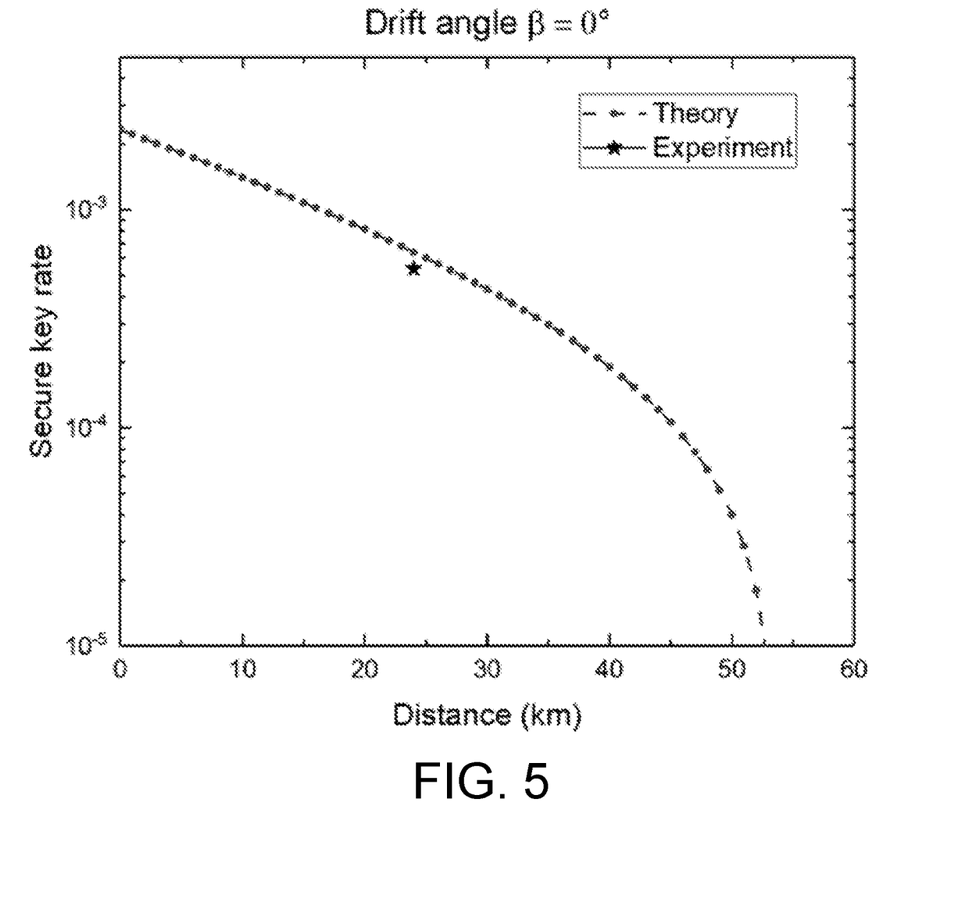
FIG. 5 is the contrast diagram between the experimental result and the theoretical simulation result based on the present invention when there is no deflection angle.

FIG. 5 is the contrast diagram between the experimental result and the theoretical simulation result when the present invention executes the RFI protocol. The experimental parameters are consistent with those used in the simulation. In the diagram, the horizontal axis is the transmission distance, and the vertical axis is the secure key rate (in bit/pulse). The dots and dotted lines in the diagram respectively represent the calculated and fitted values of the secure key rate, and the asterisks represent the experimental measured values. The experimental measurement values are close to the theoretical simulation results. This shows the feasibility of the present invention experimentally.

In summary, the present invention proposes a quantum key distribution device that can be configured with multiple protocols. This device can be compatible with BB84 protocol, RFI protocol, the six-state protocol and SARG protocol. In this description of the present invention, only BB84 protocol and RFI protocol are taken as examples for the detailed explanation of the present invention. At the same time, the device can implement multiple decoy state schemes for each protocol. This patent description takes the three-intensity decoy-state scheme as an example for specific introduction and simulation calculations. In addition, the device is also suitable for other quantum cryptography or quantum communication protocols, such as quantum digital signature, quantum secret sharing, quantum direct communication, etc.

The above-mentioned specific embodiment describes the purpose, technical solution and beneficial results of the present invention in further detail. It should be understood that the current patent description only introduces the QKD system composed of optical fiber components as an example. For example, the methods used in the specific embodiment of the present invention are also applicable to other on-chip QKD systems or free-space QKD systems, and are not limited to the present invention. Any modifications, equivalent replacements and improvements made within the spirit and principle of the present invention should all be included within the protection scope of the present invention.

What is claimed is:

1. A quantum key distribution device capable of being configured with multiple protocols includes a sender, a receiver, and a communication channel used to connect the sender and the receiver, wherein the sender includes a sender-side main control board, a laser, a first intensity modulator, a sender Faraday-Michelson (F-M) interference ring, a synchronous laser, a second intensity modulator, a first circulator, an optical attenuator, a wavelength division multiplexer, and a phase encoder;

the sender-side main control board outputs electrical signals to the laser, wherein an output end of the laser is connected to an input end of the first intensity modulator, wherein the first intensity modulator is configured to modulate a quantum light outputted by the laser;

an output end of first intensity modulator is connected to the sender F-M interference ring, wherein the sender F-M interference ring is an unequal-arm F-M interference ring; after passing through the sender F-M interference ring, the quantum light is divided into front and rear bin pulses separated by a certain time, wherein the front and rear bin pulses comprise a front bin pulse and a rear bin pulse;

an output end of the sender F-M interference ring is connected to the second intensity modulator, and the sender F-M interference ring combines with the second intensity modulator to complete a Time-bin encoding of a timestamp;

an output end of second intensity modulator is connected to an input end of the first circulator, and one output end of the first circulator is connected to the phase encoder, wherein the phase encoder is configured for phase encoding of the quantum light; the other output end of the first circulator is connected to the optical attenuator configured to attenuate an intensity of the quantum light to a single-photon level;

the sender-side main control board outputs electrical signals to the synchronous laser, wherein an output end of the synchronous laser and an output end of the optical attenuator are both connected to an input end of the wavelength division multiplexer, wherein a synchronous light outputted by the synchronous laser and the quantum light outputted by the optical attenuator enter the same optical path through an coupling of the wavelength division multiplexer so as to enter the communication channel and be transmitted to the receiver;

the receiver includes a receiver-side main control board, a wavelength division demultiplexer, a first photoelectric tube, and a decoder;

the wavelength division demultiplexer is configured to demultiplex a light received by the receiver through the communication channel, separate the quantum light and the synchronous light, convert the synchronous light into an electrical signal through the first photoelectric tube, and generate a synchronous clock signal inputted to the receiver-side main control board, wherein the quantum light enters the decoder;

the decoder includes a second circulator, a receiver Sagnac ring, a third circulator, a receiver F-M interference ring, a first photon detector, and a second photon detector;

an input end of the second circulator receives the inputted quantum light, wherein one output end of the second circulator is connected to the receiver Sagnac ring, wherein the receiver Sagnac ring is configured for phase decoding, the other output end of the second circulator is connected to an input end of the third circulator, wherein one output end of the third circulator is connected to the receiver F-M interference ring, wherein the receiver F-M interference ring is configured for Time-bin decoding, wherein the other output end of the third circulator is connected to the second photon detector; an output end of the receiver F-M interference ring is connected to the first photon detector; and the receiver-side main control board collects signals of the first photon detector and the second photon detector, and processes the signals in combination with the synchronous clock signal at the same time to obtain a secure key.

2. The quantum key distribution device capable of being configured with multiple protocols described in claim 1, wherein the sender F-M interference ring includes a first beam splitter, a first Faraday rotator, and a second Faraday rotator, wherein the first beam splitter has four beam splitting arms, namely a first beam splitting aim, a second beam splitting arm, a third beam splitting arm, and a fourth beam splitting arm, wherein the third splitting arm and the fourth splitting arm have different arm lengths, and a port of the first splitting arm is connected to an output end of the first intensity modulator, and a port of the second splitting arm is connected to the second intensity modulator, and the third splitting arm and the fourth beam splitting arm are respectively connected to the first Faraday rotator and the second Faraday rotator;

the sender F-M interference ring has the same structure as the receiver F-M interference ring; and the receiver F-M interference ring includes a second beam splitter, a third Faraday rotator and a fourth Faraday rotator, wherein the second beam splitter has four beam splitting arms, namely a fifth beam splitting arm, a sixth beam splitting arm, a seventh beam splitting arm, and an eighth beam splitting arm, wherein the seventh beam splitting arm and the eighth beam splitting arm have different arm lengths, wherein an port of the fifth beam splitting arm is connected to an output end of third circulator, a port of the sixth beam splitting arm is connected to the second photon detector, and the seventh beam splitting arm and the eighth beam splitting arm are respectively connected to the third Faraday rotator and the fourth Faraday rotator.

3. The quantum key distribution device capable of being configured with multiple protocols described in claim 1, wherein a method of the Time-bin encoding of the timestamp includes that the second intensity modulator chops one of the front bin pulse and the rear bin pulse and allows the front and rear bin pulses to pass through at the same time.

4. The quantum key distribution device capable of being configured with multiple protocols described in claim 1, wherein the phase encoder is a sender Sagnac ring, wherein the sender Sagnac ring includes a first single-polarization phase modulator, a first Faraday rotator, and a first polarization beam splitter; wherein the front bin pulse is divided into a first H component and a first V component after passing through the first polarization beam splitter, wherein the first H component is a transmitted light and the first V component is a reflected light, wherein after the transmitted first H component is phase-modulated by the first single-polarization phase modulator the transmitted first H component is rotated to a polarization direction of the first V component by the first Faraday rotator and returns to an original optical path, wherein after the first V component is rotated to a polarization direction of the component H by the first Faraday rotator, the first V component is phase-modulated through the first single-polarization phase modulator and returns to the original optical path; the rear bin pulse and the front bin pulse pass through the same optical path; the sender-side main control board transmits electrical signals to the first single-polarization phase modulator to modulate the quantum light to a specified phase;

the receiver Sagnac ring includes a second single-polarization phase modulator, a second Faraday rotator, and a second polarization beam splitter, wherein the front bin pulse is divided into a second H component and a second V component after passing through the second polarization beam splitter, wherein the second H component is a transmitted light, and the second V component is a reflected light, wherein the transmitted second H component is phase-modulated by the second single-polarization phase modulator, and then rotated to a polarization direction of the second V component by the second Faraday rotator and then returns back to the original optical path; and the second V component is rotated to a polarization direction of the second H component by the second Faraday rotator and then is phase-modulated through the second single-polarization phase modulator and returns back to the original optical path; the rear bin pulse and the front bin pulse pass through the same optical path; the receiver-side main control board sends electrical signals to the second single-polarization phase modulator to modulate the quantum light to a specified phase.

5. The quantum key distribution device capable of being configured with multiple protocols described in claim 1, wherein the sender further includes a second photoelectric tube; the output end of the first intensity modulator is connected to the second photoelectric tube, and the sender-side main control board collects signal of the second photoelectric tube while outputting electrical signals to the first intensity modulator to achieve a monitoring and tracking adjustment of a light intensity modulated by the first intensity modulator.

6. The quantum key distribution device capable of being configured with multiple protocols described in claim 2, wherein the sender further includes a second photoelectric tube; the output end of the second intensity modulator is connected to the second photoelectric tube, and the sender-side main control board collects signal of the second photoelectric tube while outputting electrical signals to the second intensity modulator to achieve a monitoring and tracking adjustment of a light intensity modulated by the second intensity modulator.

* * * * *